US009286142B2

(12) United States Patent
Cucu et al.

(10) Patent No.: US 9,286,142 B2
(45) Date of Patent: Mar. 15, 2016

(54) METHODS AND SYSTEMS FOR SUPPORTING A RENDERING API USING A RUNTIME ENVIRONMENT

(75) Inventors: Andrian Cucu, Bucharest (RO); Adrian Tanase, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 773 days.

(21) Appl. No.: 13/081,728

(22) Filed: Apr. 7, 2011

(65) Prior Publication Data

US 2012/0260267 A1  Oct. 11, 2012

(51) Int. Cl.
  G06F 13/00  (2006.01)
  G06F 17/00  (2006.01)
  G06F 9/54  (2006.01)

(52) U.S. Cl.
  CPC .. *G06F 9/541* (2013.01); *G06F 9/54* (2013.01)

(58) Field of Classification Search
  None
  See application file for complete search history.

(56) References Cited

U.S. PATENT DOCUMENTS

| | | | | |
|---|---|---|---|---|
| 6,064,382 | A * | 5/2000 | Diedrich et al. | 715/700 |
| 6,101,510 | A * | 8/2000 | Stone | G06F 17/30873 715/234 |
| 6,230,172 | B1 * | 5/2001 | Purnaveja et al. | 715/205 |
| 6,675,230 | B1 * | 1/2004 | Lewallen | 719/328 |
| 6,762,798 | B1 * | 7/2004 | Messer et al. | 348/565 |
| 6,957,391 | B2 * | 10/2005 | Broussard | 715/746 |
| 7,958,457 | B1 * | 6/2011 | Brandenberg et al. | 715/789 |
| 8,164,596 | B1 | 4/2012 | Bech | |
| 8,166,396 | B2 * | 4/2012 | Farn | 715/713 |
| 8,327,390 | B2 * | 12/2012 | Erlingsson et al. | 719/328 |
| 8,356,309 | B1 * | 1/2013 | Burrell et al. | 719/328 |
| 8,407,321 | B2 * | 3/2013 | Mickens et al. | 709/220 |
| 8,561,038 | B1 * | 10/2013 | Sams | 717/140 |
| 2002/0156909 | A1 * | 10/2002 | Harrington | H04L 29/06 709/231 |
| 2002/0165993 | A1 * | 11/2002 | Kramer | 709/315 |
| 2002/0180790 | A1 * | 12/2002 | Broussard | 345/762 |
| 2006/0005114 | A1 | 1/2006 | Williamson et al. | |
| 2007/0078992 | A1 * | 4/2007 | Bloch et al. | 709/228 |
| 2007/0139418 | A1 | 6/2007 | Abel et al. | |
| 2008/0139301 | A1 * | 6/2008 | Holthe | 463/25 |
| 2008/0263456 | A1 * | 10/2008 | Stults et al. | 715/751 |
| 2008/0303828 | A1 | 12/2008 | Marchant et al. | |
| 2009/0228784 | A1 | 9/2009 | Drieu et al. | |
| 2009/0315894 | A1 | 12/2009 | Goodwin | |
| 2010/0235820 | A1 * | 9/2010 | Khouzam et al. | 717/148 |

(Continued)

OTHER PUBLICATIONS

Moshchuk, "FlashProxy: Transparent Enabling Rich Web Conent via Remote Execution", Jun. 20, 2008, ACM, 978-160558-139—Feb. 8, 2006, pp. 1-13.*

(Continued)

*Primary Examiner* — Charles E Anya
*Assistant Examiner* — Phuong Hoang
(74) *Attorney, Agent, or Firm* — Kilpatrick Townsend & Stockton LLP

(57) ABSTRACT

A computing device can comprise an I/O interface and a processing element connected to the I/O interface and implementing a runtime environment. The processing element can implement a program component that causes the processing element to expose a rendering API not natively supported by the runtime environment, the rendering API invocable by code comprised in a markup document accessed by the processor over the I/O interface. The rendering API can be exposed by causing the runtime environment to respond to and update a proxy object that mirrors properties, methods, and behaviors defined by the rendering API.

24 Claims, 4 Drawing Sheets

(56) References Cited

U.S. PATENT DOCUMENTS

| | | | | |
|---|---|---|---|---|
| 2010/0281042 | A1* | 11/2010 | Windes et al. | 707/756 |
| 2010/0281258 | A1* | 11/2010 | Andress et al. | 713/168 |
| 2011/0016449 | A1* | 1/2011 | Yao et al. | 717/106 |
| 2011/0138354 | A1* | 6/2011 | Hertenstein | G06F 8/38 717/115 |
| 2011/0193857 | A1* | 8/2011 | Filippov et al. | 345/419 |
| 2011/0197124 | A1* | 8/2011 | Garaventa | 715/234 |
| 2011/0289108 | A1* | 11/2011 | Bhandari | G06F 17/30905 707/769 |
| 2012/0076197 | A1* | 3/2012 | Byford et al. | 375/240.01 |
| 2012/0144290 | A1* | 6/2012 | Goldman | G06F 9/45529 715/234 |
| 2013/0127875 | A1 | 5/2013 | Blas et al. | |
| 2013/0127877 | A1 | 5/2013 | Blas et al. | |
| 2013/0132840 | A1 | 5/2013 | Blas et al. | |

OTHER PUBLICATIONS

Fulton, "New mobile browser enables Flash video through server-side rendering", Jan. 28, 2008, pp. 1-4.*

Non final Office Action in related U.S. Appl. No. 13/018,830 dated May 9, 2013, 25 pages.

Final Office Action in related U.S. Appl. No. 13/018,830 dated Dec. 3, 2013, 28 pages.

Non Final Office Action in related U.S. Appl. No. 13/081,745 dated Feb. 7, 2014 29, pages.

"JSON in JavaScript" http://json.org/js.html. Archived on Mar. 7, 2006. Retrieved on Feb. 3, 2014 from <https://web.archive.org/web/20060307094212/http://json.org/js.html>.

"A bit of SVG and Canvas" http://nimbupani.com/a-bit-of-svg-and-canvas.html. Published on Aug. 26, 2009. Retrieved on Feb. 4, 2014.

"Macromedia Dreamweaver—Animating layers in a Dreamweaver 4 timeline" http://www.adobe.com/support!dreamweaver/interactivity/layers_timeline/index.html. Archived on Dec. 25, 2009. Retrieved on Jan. 29, 2014 from <https://web.archive.org/web/20091225151413/http://www.adobe.com/support!dreamweaver/interactivity/layers_Timeline/index . . . .

"Animation in Dreamweaver" http://www.adobetutorialz.com/articles/581/1/Animation-in-Dreamweaver. Archived on Apr. 18, 2007. Retrieved on Jan. 25, 2014 from <https://web.archive.org/web/20070418014940/http://www.adobetutorialz.com/articles/581/1/Animation-in-Dreamweaver>.

"Using Canvas in SVG" http://www.svgopen.org/2009/papers/12-Using_Canvas_in_SVG/. Archived on Nov. 16, 2009. Retrieved on Jan. 25, 2014 from <https://web.archive.org/web/20091116023727/http://www.svgopen.org/2009/papers/12-Using_Canvas_in_SVG/>.

"Simple Animation in the HTML5 Canvas Element" http://html5.1itten.com/simple-animation-in-the-html5-canvas-element. Archived on Sep. 12, 2010. Retrieved on Jan. 25, 2014 from <https://web.archive.org/web/20100912164221/http://html5.1itten.com/simple-animation-in-the-html5-canvas-element>.

"SVG and CSS—Cascading Style Sheets" http://tutorials.jenkov.com/svg/svg-and-css.html. Archived on Mar. 4, 2009. Retrieved on Jan. 28, 2014 from <http://web.archive.org/web/20090304005418/http://tutorials.jenkov.com/svg/svg-and-css.html>.

"SVG or Canvas? Choosing between the two" http://dev.opera.com/articles/view/svg-or-canvas-choosing-between-the-two. Archived on Feb. 8, 2010. Retrieved on Jan. 25, 2014 from <https://web.archive.org/web/20100208152221/http://dev.opera.com/articles/view/svg-or-canvas-choosing-between-the-two>.

* cited by examiner

METHODS AND SYSTEMS FOR SUPPORTING A RENDERING API USING A RUNTIME ENVIRONMENT

BACKGROUND

Internet users enthusiastically consume of video and other multimedia content. Such content is often distributed using code, such as HTML or other markup code, configured to invoke the capabilities of an application to retrieve the content and render the content according to a video rendering application programming interface (API) exposed by the application. As an example, a runtime environment such as the Adobe® Flash® player or AIR® runtime environment (both available from Adobe Systems Incorporated of San Jose, Calif.) may be used to render video. However, some users may not have access to a device that supports such a runtime environment.

Recently, the HTML standard has been extended to include video rendering APIs invoked by including the <video> and other elements in HTML code whereby a browser can be used to render the video natively. Despite recent expansions of APIs to add video and other support to browsers, there remains room for improvement in both the user experience and the experience of developers who work to distribute content to the users.

SUMMARY

A computing device can comprise an input-output (I/O) interface and a processing element connected to the I/O interface and implementing a runtime environment. The processing element can implement a program component that causes the processing element to expose a rendering API not natively supported by the runtime environment, the rendering API invocable by code comprised in a markup document accessed by the processor over the I/O interface. The rendering API can be exposed by causing the runtime environment to respond to and update a proxy object that mirrors properties, methods, and behaviors defined by the rendering API.

For example, through use of the proxy object, the runtime environment can be caused to respond to code that invokes commands specified according to the HTML <video> API. Thus, developers can write code that invokes the <video> API with confidence that the same code can be used with or without the runtime environment. Additionally, the developers can write code that still takes advantage of the capabilities of the runtime environment that extend beyond the capabilities of the browser or other rendering application.

These illustrative embodiments are discussed not to limit the present subject matter, but to provide a brief introduction. Additional embodiments include computer-readable media for exposing and utilizing rendering API functionality through use of proxy objects, along with computer-implemented methods of doing the same. These and other embodiments are described below in the Detailed Description. Objects and advantages of the present subject matter can be determined upon review of the specification and/or practice of an embodiment configured in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Presently-disclosed embodiments include computing systems, methods, and computer-readable media embodying code. For example, a rendering API such as the "HTML5" video API can be provided on top of a runtime such as the Flash® player plug-in so that web developers can use a consistent, standardized API without the need to deal with Flash® player or other runtime-specific APIs. Additionally, resources can be consolidated (e.g., no need to have separate libraries for both the HTML native video player and Flash video player) when a webpage has both the Flash player and HTML native video for video content for use by different client devices. In some implementations, script-based getters and setters are used to map rendering API calls to runtime calls and to provide rendering API responses based on runtime state changes/events by getting and setting mirrored properties of the <video> API.

Figure 1:
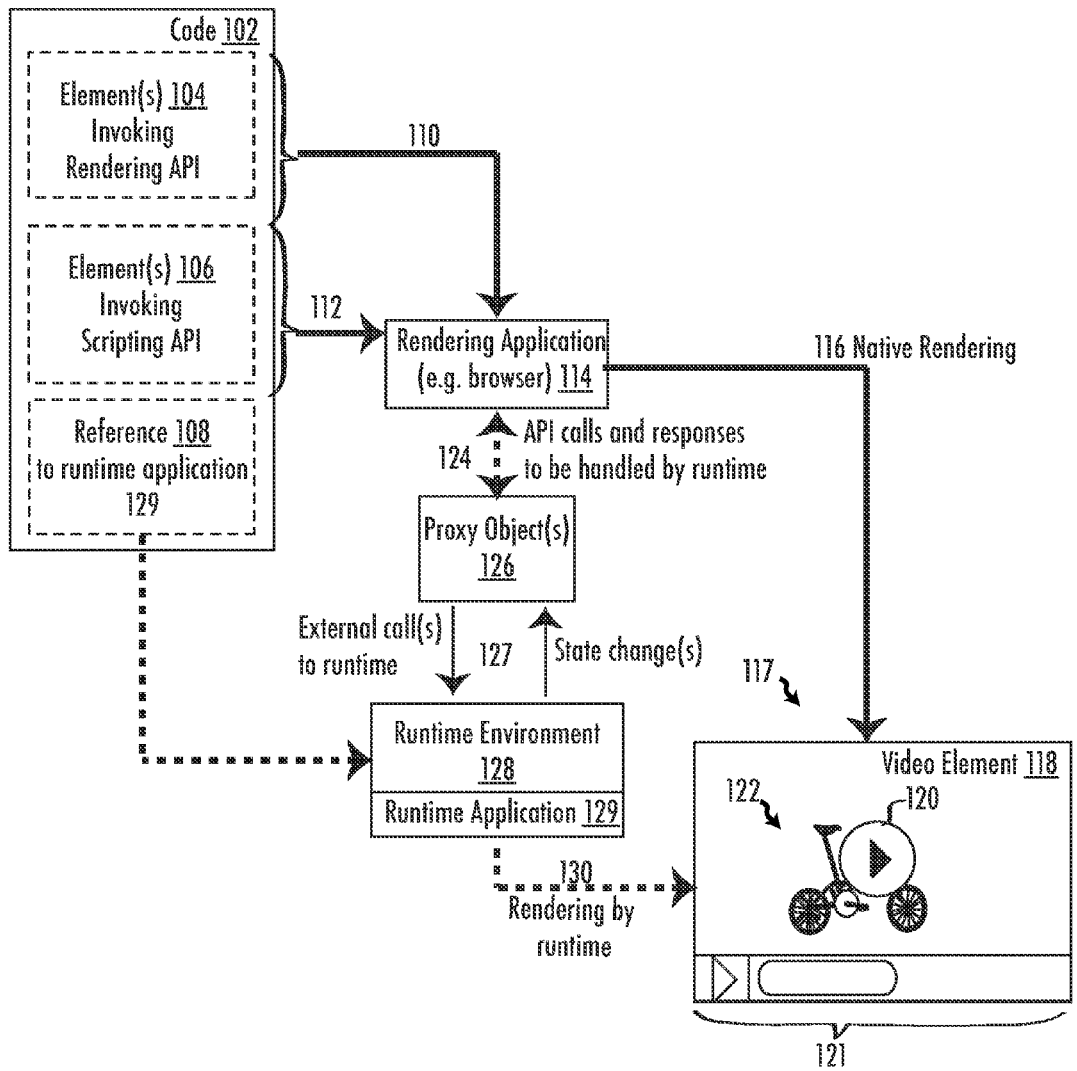
FIG. 1 is a data flow diagram illustrating how one or more proxy objects can be used to expose API functionality via a runtime environment.

Turning to FIG. 1, for example, an illustrative data flow diagram shows how one or more proxy elements can be used to expose API functionality not natively supported by a runtime environment.

In particular, code 102 includes one or more elements 104 invoking the rendering API along with one or more elements 106 invoking a scripting API to set up the proxy objects. Code 102 also includes a reference 108 to a runtime application 129. In this example, as shown at 110 the calls to the rendering API and the calls to the scripting API shown at 112 are at least initially processed by a rendering application 114, which represents a browser or some other application that pareses code 102. Rendering application 114 also includes suitable functionality to recognize the scripting API calls; for example, rendering application 114 can include a JavaScript™ or other engine that supports the scripting calls.

Rendering application 114 may include functionality to natively support at least some of the rendering API calls defined by elements 104. Thus, as shown at 116, rendering application provides at least some portion(s) of a graphical user interface 117 that includes (in this example) a video element 118 and control button 120, which can be used to handle input events controlling playback of video content 122 (e.g., playing/pausing in response to input directed to the triangular "play" button shown here) and provide updates as the state of content 122 changes. As another example of a control element, a control bar 121 with a scrub bar can be used during playback and the scrub bar can be moved from left to right as the video progresses.

In accordance with the present subject matter, however, rendering application 114 sets up one or more proxy objects 126 so that, as shown at 124, one or more calls to the rendering API can be handled by a runtime environment 128 executing/interpreting runtime application 129 so that, effectively, runtime environment 128 exposes the rendering API. For example, proxy object 126 can be configured to have the same property names, method names, and behavior defined by the rendering API, so that proxy object 126 dispatches the same events based on state changes in the video or other rendered content as would be expected by a native implementation.

Proxy object 126 monitors for events, such as user input or other events that invoke the rendering API to change a property associated with the rendering API. As shown at 127, in response to a property change, proxy object 126 invokes corresponding functionality of the runtime player via an external call API provided by the runtime. As also shown at 127, proxy object 126 also responds to a change in state of runtime environment 128 by propagating the state change to one or more of its properties and dispatches an appropriate event or events as defined in the rendering API.

For example, as shown at 130, runtime environment 128 may be used to provide some or all of the elements of graphical user interface 117. As one particular example, code 102 may specify that runtime environment 128 is to provide video element 118 while the native API capabilities of browser 114 are used to render control button 120 and other "chrome," such as through use of a control bar 121 defined using HTML and CSS code. This may allow for use of the same controls across platforms regardless of whether those platforms all support runtime environment 128 and/or to allow use of capabilities of the runtime environment 128 such as support for multicasting, content protection (e.g., encrypted content streaming). Thus, input events directed toward the browser-provided control bar UI elements can be propagated to proxy object 126 which then invokes functionality of runtime environment 128. For instance, the video may be specified as a SWF or other file played back by the runtime environment if available.

In response to an input event directed toward control button 120, the state of proxy object 126 can be updated. In response to the change in its state, proxy object 126 can invoke functionality of runtime environment 128, such as by providing a play( ) or pause( ) command exposed by runtime environment 128 as part of the runtime environment's external control API. Similarly, as the state of runtime environment 128 changes, for example as the time index of the video increases, the time index can be propagated to proxy object 126 which dispatches appropriate events to make control button visible or invisible. In addition to or instead of storing state changes in proxy object 126, one or more properties can be mirrored by proxy object 126 by using property values associated with the rendering API to trigger commands to runtime environment 128 through custom getter methods and/or by updating values of properties for objects associated with the rendering API in response to activity by runtime environment 128 through custom setter methods.

As another example, code 102 may invoke a video rendering API to provide video element 118 and control button 120. However, in order to take advantage of reporting capabilities of a runtime application (e.g., to track if users skip commercials) and/or advanced graphic capabilities of the runtime environment, code 102 may be configured with suitable scripting elements 106 so that a suitable runtime application is used to provide the control bar. For example, code 102 can include an element referring to a SWF or other runtime file that provides the control bar.

As user input events are directed to the elements provided by rendering application 114, proxy object(s) 126 can be updated and used to dispatch appropriate events according to the video rendering API. For example, a "play" or "pause" input to the runtime application can cause corresponding updates to the state of proxy object 126, which dispatches an appropriate command to the browser's video rendering components to begin or pause playback, respectively.

Other events can be used to invoke the video rendering API. For example, a page may include logic that indicates that a video is to be paused while an advertisement is displayed, such as by dispatching a pause( ) command when the video reaches a certain time. If, for example, the runtime environment is used to playback the video, then the pause( ) command dispatched by the page logic can be mapped to a corresponding pause command to the runtime.

The examples above are for purposes of illustration only. In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

Figure 2:
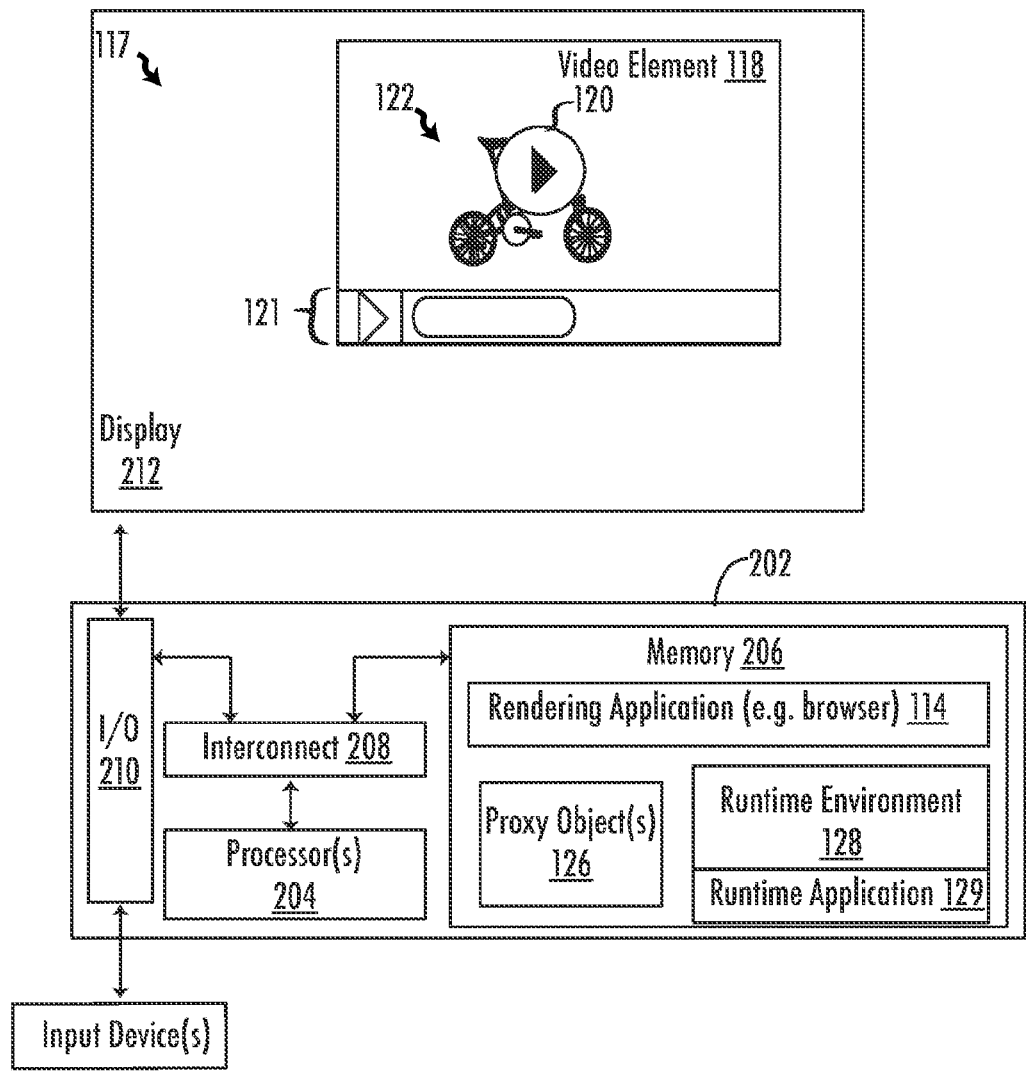
FIG. 2 is a diagram showing an illustrative system configured to use a proxy object to expose API functionality via a runtime environment.

FIG. 2 is a diagram showing an illustrative computing device 202 being used to provide video content 122 as shown in FIG. 1 through use of rendering application 114, proxy object 126, and runtime environment 128. Computing device 202 may alternately be referred to as a data processing system, computerized device, or simply a "computer." Computing device 202 represents a desktop, laptop, tablet, or any other computing system. Other examples of computing device 202 include, but are not limited to, mobile devices (PDAs, smartphones, media players, gaming systems, etc.), gaming devices, televisions and television set-top boxes, and embedded systems (e.g., in vehicles, appliances, or other devices).

Generally speaking, computing device 202 features one or more data processing hardware elements implementing rendering application 114 and runtime environment 128. Rendering application 114 causes computing device 202 to parse code 102 of FIG. 1 and set up proxy object(s) 126 and, to the extent runtime environment 128 is not used, to respond to rendering API calls specified in code 102. Code 102, of course, can be provided as one or more files. In this example, the rendering API is a video rendering API, but it will be understood the principles discussed herein can be applied to other rendering APIs for which use of a runtime environment would be desirable.

Proxy object(s) 126 can be implemented in a non-transitory computer-readable medium in a way that provides for updating of attributes of proxy object(s) 126 and allows for methods defined by proxy object(s) 126 to be carried out by suitable processing hardware. For example, rendering application 114 can include a Javascript™ or other scripting engine whose functionality is used to provide proxy object(s) 126 based on scripting API calls set forth in code 102.

Runtime environment 128 provides an execution environment for one or more runtime applications 129 referenced by code 102. For example, runtime application 129 may comprise cross-platform bytecode usable on any platform that provides runtime environment 128. In some implementations, runtime environment 128 comprises an environment such as Adobe® Flash® or AIR®, noted above, Microsoft® Silverlight® (available from Microsoft Corporation of Redmond Wash.), a Java® Virtual Machine (available from Oracle Corporation of Redwood Shores, Calif.), or some other runtime. Runtime application 129 may be downloaded from a network connection or accessed from storage in response to reference 108 in code 102, or could even be accessed directly with code 102 when code 102 is initially accessed. Runtime environment 128 may execute within an operating system that also supports rendering application 114. However, runtime environment 128 could itself comprise the operating system in some implementations. When implemented as software, runtime environment 128 itself could be downloaded if not already resident on device 202, and runtime environment 128 and application 129 could even be distributed as an integrated unit, if desired.

Rendering application 114 and/or runtime environment 128 can be implemented in hardware accessible by or as part of the data processing element (e.g., as an application-specific integrated circuit, (ASIC), programmable logic device (e.g., PLAs, FPGAs, etc.)). As another example, rendering application 114 and/or runtime environment 128 can be implemented using software or firmware that configures the operation of a processor or processors.

In the example shown in FIG. 2, computing device 202 features a data processing hardware element comprising one or more processors 204 and a computer-readable medium (memory 206) interconnected via an interconnect 208, representing internal busses, connections, and the like. Interconnect 208 also connects to I/O components 210, such as universal serial bus (USB), VGA, HDMI, serial, and other I/O connections to other hardware of the computing system. The hardware also includes one or more displays 212. It will be understood that computing device 202 could include other components, such as storage devices, communications devices (e.g., Ethernet, radio components), and other I/O components such as speakers, a microphone, or the like.

Generally speaking, interconnect 208 is used to receive code 102 and the underlying content to be rendered, store code 102 and the content data as needed, such as in a local hard drive, cache memory, network storage, etc., and relay rendered content to I/O interface 210 for display be display device 122. Input is provided via suitable input devices such as a mouse, keyboard, touch screen interface, etc.

Computer-readable medium 206 may comprise RAM, ROM, or other memory and in this example embodies code of rendering application 114, proxy object 126, runtime environment 128, and runtime application 129. It will be understood that code 102 may also be stored in computer-readable medium 206 or some other medium.

Figure 3:
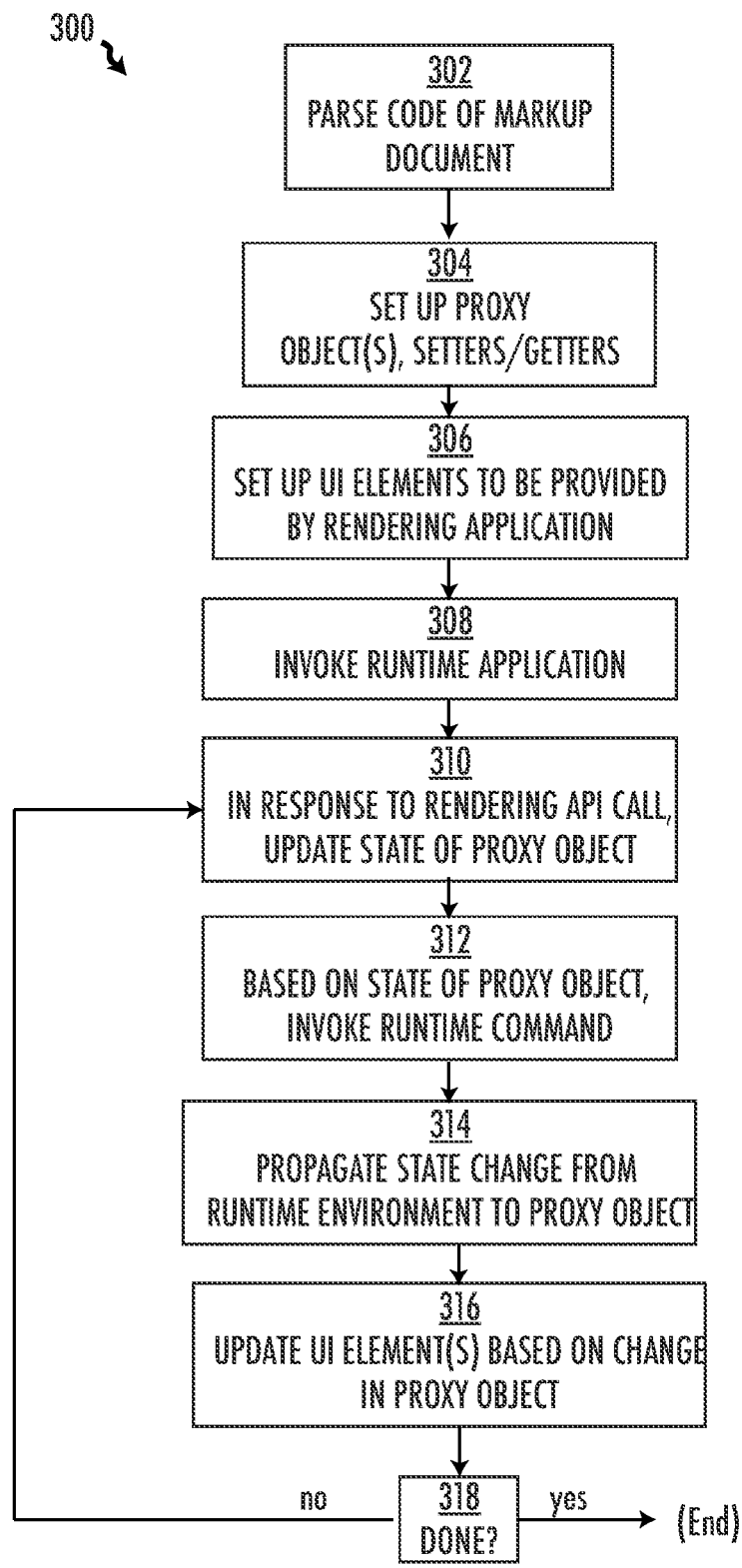
FIG. 3 is a flowchart showing steps of an illustrative method of exposing API functionality via a proxy object and using such functionality.

FIG. 3 is a flowchart showing steps of an illustrative method 300 of exposing API functionality via a proxy object and using such functionality. Block 302 represents parsing code of a markup or other document that invokes a rendering API. For example, block 302 can be carried out by a browser or other rendering application 114 of FIGS. 1-2.

Block 304 represents setting up one or more proxy objects 126. For example, the markup document can be configured with code that invokes a scripting API supported by rendering application 114 so that the proxy objects can be instantiated so as to mirror properties, methods, and behaviors defined by the rendering API. In some implementations, the proxy object(s) 126 provide each and every property, method and behavior of the rendering API (or APIs) to be exposed to ensure that the expected capabilities of the rendering API are provided.

Additionally, the markup document can define getter and setter methods supported by the scripting API in order to map runtime events and states to the rendering API and invoke runtime functionality/set runtime states in response to calls to the rendering API. A getter is a method that gets the value of a specific property. A setter is a method that sets the value of a specific property. Thus, at block 304 when the proxy object is set up, appropriate getters and setters can be initialized to bridge between the rendering API and external interface calls of the runtime environment.

In some implementations a JavaScript plain proxy object can be provided that mirrors the HTMLVideoElement, HTMLAudioElement, and HTMLMediaElement APIs as defined in the HTML standard (see, e.g., HTML Standard (7 Apr. 2011), by Ian Hickson published by WHATWG, which is incorporated by reference herein in its entirety). The object can have exactly the same property names, exactly the same method names, and the same behaviour, as described in the specifications (e.g., for the APIs above, the proxy object dispatches exactly the same VideoElement/MediaElement events specified in the spec that reflect the changes in the state of the underlying implementation). Implementations that mirror the API at the property level can advantageously allow code written to invoke the rendering API to be reused with minimal or no modification to accommodate use of the proxy/runtime since the API specification is respected fully. Other APIs can be mirrored than the ones noted above, of course. Additional examples include, but are not limited to, HTMLFormElement, HTMLCanvasElement, HTMLTableElement, etc.

Block 306 represents setting up UI and other elements (e.g., video element 118) to be provided by the rendering application, while block 308 represents invoking the runtime application. Block 306 can also include setting up additional UI elements by another specific application. The setup operations can include instantiating objects and other program components to render the UI elements and perform other functionality. The particular balance of what functions are handled by the rendering application and runtime application can vary according to particular implementations. The runtime application can be downloaded or otherwise accessed by the runtime environment for execution as needed in response to input commands or events.

For example, the markup document will typically invoke functionality to be handled natively by the rendering application, such as various web page elements such as text and images. Depending upon the particular implementation, the rendering application may be used to render video content, video controls, and the like, with the runtime application playing a "background" role to monitor and report playback. As another example, the runtime application may be used to drive video playback while the rendering application's native capabilities are used to provide controls and "chrome" for a consistent appearance. As a further example, the runtime application can be used for "chrome" and controls while the rendering application handles the actual video rendering.

In any event, for those invocations of the rendering API to be handled by the runtime application, the UI (and other elements) are set up so that user and other events that invoke the rendering API cause an update to the state of the proxy object(s) and/or are tied to getter and setter methods so that events and state changes are passed through directly to the runtime without storing the state in the proxy object.

In this example, as shown at block 310, in response to a rendering API call, the state of the proxy object can be updated. Then, at block 312 a runtime command is invoked based on the state of the proxy object. However, if getter/setter methods are supported, then a rendering API call can be mapped directly to a call to one or more methods of the runtime to cause the runtime to respond.

For example, in some implementations, JavaScript method calls are proxied (via the proxy object) to methods exposed by the runtime environment. For example, the Flash® runtime environment provides ExternalInterface calls that the proxy object can invoke in response to UI or other events invoking the rendering API. Thus, the state change of the proxy object may simply be receipt of the API call, which then directly leads to a corresponding call to the runtime.

Additionally or alternatively, the rendering API call may be of a type that changes an attribute defined by the rendering API, with that attribute maintained as a writable attribute of the proxy object. Changes made to writable attributes of the proxy object can be handled in different ways depending upon the capabilities of rendering application 114. For example, the scripting engines of more recent versions of browsers allow for custom getters and setters to be defined through calls to the scripting API as noted above. For those browsers, getters and setters can be defined so that the change to the writable attribute causes the proxy object to call a method exposed by the runtime environment. For example, if an input or other event calls "currentTime=30" in Javascript, the proxy object can make a call "setCurrentTime(30)" to the Flash® runtime (via ExternalInterface).

Not all browsers support custom setters and getters. To address those cases, the scripting code can include scripting API calls to maintain a first copy of the proxy object and a second copy of the proxy object, the first and second copies identical when first initialized. For instance, the proxy object may be initialized along with an object that acts as a carbon copy of the state of the runtime. The proxy object can regularly poll the carbon copy and, when the carbon copy and proxy object states do not match, the proxy object can determine if the rendering API has been invoked and make an appropriate call to the runtime (e.g., for the Flash® runtime, using ExternalInterface).

Block 314 represents propagating a state change from the runtime environment to the proxy object, while block 316 represents updating UI elements or taking other action in the rendering application based on the propagated state change. These blocks are shown after blocks 310-312, though they could occur before blocks 310-312 or even in parallel. Generally speaking, the runtime environment can make a call to the scripting API to update the state of the proxy object and/or to invoke a method defined by the proxy object, with the proxy object then dispatching as appropriate to the rendering API.

For example, if the Flash® runtime is used, the ExternalInterface can make a call the Javascript API to update one or more properties of the Javascript proxy object. In some implementations, updating occurs without further processing unless there has been a change to the writable attribute already, in which case the conflict is resolved in favor of the existing change to the proxy object. In response to the change, a Javascript event that matches the event(s) specified in the rendering API (e.g., events as defined in the HTML <video> API) is dispatched.

As noted above, not all browsers may support getters and setters sufficient to identify when changes have been made to the proxy object. Thus, the carbon copy approach outlined above can also be used to determine when the runtime has propagated a state change.

As shown at block 318, the method can loop through blocks 310-316 until rendering is complete. For example, rendering can be complete when the video or other content is finished or if a user exits early. Other exit conditions can be defined, of course.

Figure 4:
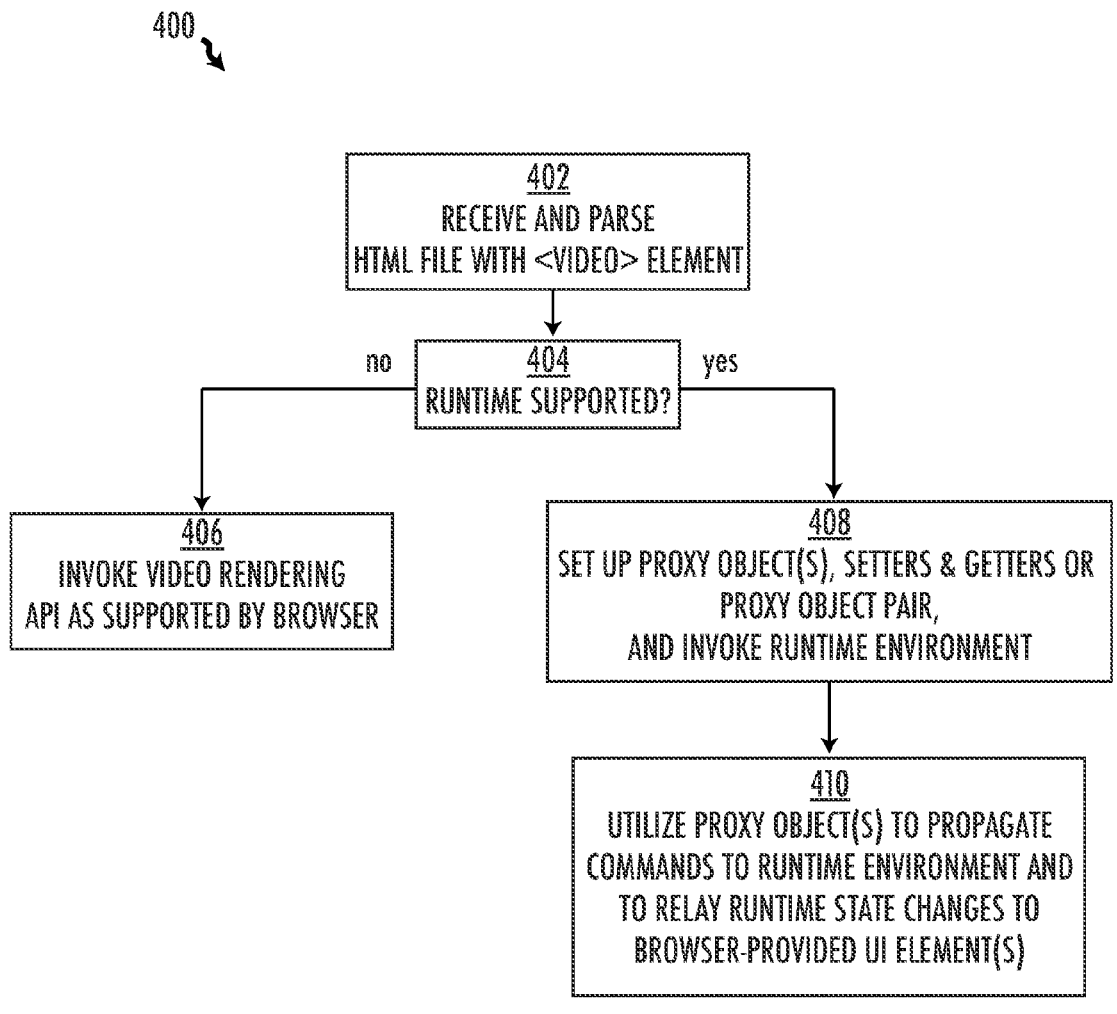
FIG. 4 is a flowchart showing steps of an illustrative method of selectively using a runtime environment to expose a video rendering API not natively supported by the runtime environment.

FIG. 4 is a flowchart showing steps of an illustrative method 400 of selectively using a runtime environment to expose a video rendering API not natively supported by the runtime environment. For instance, code 102 of FIG. 1 may cause computing devices (such as computing device 202) to carry out the flow shown at 400.

Block 402 represents receiving and parsing, by a browser, an HTML file with a <video> element and scripting elements configured as discussed above. For instance, the HTML file may invoke at least some functionality of the HTML5 <video> rendering API. Block 404 represents determining whether the computing device supports a runtime environment needed to use a runtime application referenced by the HTML file. For example, JavaScript or other code can be used to identify a device type and/or whether Flash® or another runtime environment is installed.

If the runtime environment is not available, then flow proceeds to block 406, which represents invoking the video rendering API as natively supported by the browser. However, if at block 404 the runtime environment is found, then flow proceeds to block 408. Block 408 represents setting up one or more proxy objects with setters and getters, or a proxy object and carbon copy, while block 410 represents using the proxy object(s) to propagate commands to the runtime environment and to relay runtime state changes to browser-provided UI elements and other elements. For example, these steps can be carried out according to the teachings noted above with FIG. 3.

Developers and content distributors, by configuring markup or other code 102 to cause a computing device to operate as discussed herein, can be spared the trouble of preparing multiple versions of code for different platforms. Instead, the developer/content distributor can generate code according to a commonly-supported rendering API (e.g., the HTML <video> API) but without giving up the advantages of using a runtime environment (e.g., the Flash® or AIR® runtime) for those devices that support the runtime environment.

For example, as noted above, the runtime environment can be used to provide capabilities, such as multicasting, protected content distribution, usage tracking, and the like that are not supported by the rendering API. Thus, the same HTML or other file can be distributed, for example, to television set-top boxes that support the runtime, mobile devices that support the runtime, but also to mobile devices, tablets, etc. that may not support the runtime.

The parsing and API exposing operations discussed above can be carried out at a client device that also displays the rendered content. However, in alternative implementations, the parsing and API exposing operations can be carried out at a server which then relays data representing the content to be rendered to other devices that actually render the content.

The example of FIG. 4 and other examples above discussed a browser and the HTML <video> rendering API. It will be understood that other applications can support the rendering API, and other rendering APIs can be used. Additionally, the rendering application was described as the application that exposes the scripting API. Additional embodiments could use a separate application or process to expose the scripting API, with inter-process communication between that separate application and rendering application used as needed to coordinate input to and output from the rendering application-provided elements. Still further, several examples above referred to markup code, but other code (e.g., binary code) that invokes the rendering and scripting APIs and invokes the runtime environment could be used instead of markup code (i.e. for code 102).

Development tools can utilize the principles noted above to allow developers to deploy code that invokes a rendering API and which also uses a runtime environment when available. For example, a web development application can include a user interface, code manager, and other components used to define HTML or other web page code. In one implementation, the web development application can be configured to identify <video> tags, for example or other syntax that invokes a rendering API. The page can be updated to use a runtime environment (e.g., by referencing a Flash® or other plugin) and to include JavaScript code to map API calls to the Flash® player, while preserving the original rendering API calls for devices that do not utilize Flash® (or other runtime environments). In some implementations, the <video> tag is replaced with a <div> to avoid issues that arise on some devices if the <video> tag itself is entirely replaced with runtime-based playback.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

Although several examples featured mobile devices, the various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

A computing device may access one or more non-transitory computer-readable media that embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, mobile devices (e.g., tablets, smartphones, personal digital assistants (PDAs), etc.) televisions, television set-top boxes, portable music players, and consumer electronic devices such as cameras, camcorders, and mobile devices. Computing devices may be integrated into other devices, e.g. "smart" appliances, automobiles, kiosks, and the like.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computer, comprising:
   a processor; and
   a non-transitory computer readable medium comprising instructions that, when executed by the processor, cause the computer to perform operations comprising:
   parsing code of a markup document using a browser, the code using calls to an application programing interface (API) to specify content to be rendered and the code further specifying a proxy object;
   creating the proxy object by interpreting the code of the markup document;
   invoking a runtime environment by interpreting the code of the markup document;
   updating a state of the proxy object based on a call to the API, the call initiated based on the browser using the code of the markup document, the call to the API native to the browser and non-native to the runtime environment;
   determining that the state of the proxy object has changed; and
   based on determining that the state of the proxy object has changed, invoking a command of the runtime environment to provide an additional graphical element or additional functionality in content rendered by the browser, wherein updating the state of the proxy object by interpreting the code of the markup document and then invoking the command based on the change in the state of the proxy object enables the runtime environment to respond to the code in the markup document that uses a property, method, or behavior that is native to the browser but non-native to the runtime environment.

2. The computer of claim 1, wherein the API comprises a video rendering API.

3. The computer of claim 2, wherein the markup document references a video to be played back using the runtime environment with at least one control element rendered by the browser and configured to invoke the API.

4. The computer of claim 1, wherein the markup document is configured to invoke functionality of a scripting API that causes the processor to maintain the proxy object in the non-transitory computer readable medium.

5. The computer of claim 4, wherein the markup document is configured to invoke a getter method of the scripting API that causes the processor to obtain a value of a mirrored property and, based on the value of the mirrored property, invoke the command of the runtime environment, and
wherein the markup document invokes a setter method of the scripting API that causes the processor to set a value of a property mirrored by the proxy object in response to an event or state change of the runtime.

6. The computer of claim 4, wherein the runtime environment causes the processor to propagate state changes from the runtime environment to the proxy object by invoking the scripting API to change the state of the proxy object.

7. The computer of claim 4, wherein the proxy object causes the processor to dispatch a scripting event matching an event format of the API.

8. The computer of claim 1, wherein the markup document is configured to invoke a scripting API to cause the processor to maintain a first copy of the proxy object and a second copy of the proxy object, the first and second copies identical when first initialized, and
wherein the runtime environment is configured to, after the first and second copies are first initialized, determine if the API has been invoked by determining if one of the first and second copies of the proxy object has changed.

9. The computer of claim 1, wherein the proxy object causes the processor to respond to input changing a writable attribute defined by the API by changing an attribute of the proxy object.

10. The computer of claim 1, wherein the runtime environment is implemented by executing the instructions stored in the non-transitory computer readable medium.

11. The computer of claim 1, wherein the markup document comprises an HTML document, wherein the HTML document references a JavaScript file, and wherein the JavaScript file invokes a scripting functionality that comprises JavaScript.

12. A non-transitory computer-readable medium comprising instructions that, upon execution with a processor, cause a system to perform operations comprising:
parsing code of a markup document using a browser application, the code using calls to an application programing interface (API) to specify content to be rendered and the code further specifying a proxy object;
creating the proxy object by interpreting the code of the markup document;
a runtime application by interpreting the code of the markup document; and
updating a state of the proxy object based on a call to the API, the call initiated based on the browser application using the code of the markup document, the call to the API native to the browser application and non-native to the runtime application;
determining that the state of the proxy object has changed; and
based on determining that the state of the proxy object has changed, invoking a command of the runtime application to provide an additional graphical element or additional functionality in content rendered by the browser application, wherein updating the state of the proxy object and then invoking the command based on the change in the state of the proxy object enables the runtime application to respond to the code in the markup document that uses a property, method, or behavior that is native to the browser application but non-native to the runtime application.

13. The non-transitory computer-readable medium of claim 12, wherein the proxy object is maintained by a scripting API, wherein the scripting API is invoked based on code invoking scripting functionality of the browser application.

14. The non-transitory computer-readable medium of claim 13, wherein the proxy object mirrors the property names, method names, and behaviors defined by HTMLVideoElement, HTMLAudioElement, and HTMLMediaElement APIs.

15. The non-transitory computer-readable medium of claim 12, wherein the code of the markup document comprises a first markup element referencing a runtime application to be executed in a runtime environment to play a video.

16. The non-transitory computer-readable medium of claim 15, wherein the operations further comprise:
generating an interface element based on-a second markup element defining how the interface element is to be rendered; and
providing the command to invoke the call supported by the video rendering API in response to an input event generated by the interface element.

17. The non-transitory computer-readable medium of claim 16, wherein the call supported by the video rendering API comprises a playback control command and the method invoked by the proxy object comprises a corresponding method that controls playback of the video by the runtime environment.

18. A computer-implemented method, comprising:
parsing code of a markup document using a browser, the code using calls to an application programing interface (API) to specify content to be rendered and the code further specifying a proxy object;
creating the proxy object by interpreting the code of the markup document;
invoking a runtime environment by interpreting the code of the markup document;
updating a state of the proxy object based on a call to the API, the call initiated based on the browser using the code of the markup document, the call to the API native to the browser and non-native to the runtime environment;
determining that the state of the proxy object has changed; and
based on determining that the state of the proxy object has changed, invoking a command of the runtime environment to provide an additional graphical element or additional functionality in content rendered by the browser, wherein updating the state of the proxy object by interpreting the code of the markup document and then invoking the command based on the change in the state of the proxy object enables the runtime environment to respond to the code in the markup document that uses a property, method, or behavior that is native to the browser but non-native to the runtime environment.

19. The method of claim 18, further comprising:
in response to determining the state of the proxy object has changed and based on the state of the proxy object, dispatching an event defined by the video rendering API.

20. The method of claim 19, further comprising:
prior to determining the state of the proxy object has changed, updating an attribute of the proxy object in response to a change of state of the runtime environment, wherein the event that is subsequently dispatched is defined by the proxy object to correspond to the attribute as updated.

21. The method of claim 1, wherein the code comprises human-readable source code and the runtime executes the code directly using just-in-time compilation.

22. The method of claim 1, wherein the API comprises at least one class defining an object including a plurality of methods for rendering graphical elements.

23. The computer of claim 1, wherein the browser is configured to:
determine, based on parsing the code of the markup document, that a first call to the API is to be handled by the runtime environment and that a second call to the API is to be handled by the browser, the first call and the second call associated with rendering the content of the markup document,
handle the second call to the API, and
cause the proxy object to enable the runtime environment to handle the first call to the API.

24. The computer of claim 1, wherein a change to a state of the runtime environment is propagated to the proxy object, and wherein the proxy object is configured to dispatch an event in the browser in response to the propagated change in state of the runtime environment.

* * * * *